United States Patent
Baquet et al.

(10) Patent No.: US 10,791,849 B2
(45) Date of Patent: Oct. 6, 2020

(54) INSULATING GLAZING UNIT, IN PARTICULAR FOR A CLIMATE CHAMBER

(71) Applicant: SAINT-GOBAIN GLASS FRANCE, Courbevoie (FR)

(72) Inventors: Erwan Baquet, Compiegne (FR); Romain Decourcelle, Margny les Compiegne (FR); Edouard Jonville, Courbevoie (FR); Yoann Machizaud, Lyons (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 20 days.

(21) Appl. No.: 16/085,833

(22) PCT Filed: Feb. 23, 2017

(86) PCT No.: PCT/EP2017/054175
§ 371 (c)(1),
(2) Date: Sep. 17, 2018

(87) PCT Pub. No.: WO2017/157634
PCT Pub. Date: Sep. 21, 2017

(65) Prior Publication Data
US 2019/0090660 A1 Mar. 28, 2019

(30) Foreign Application Priority Data
Mar. 18, 2016 (FR) ...................................... 16 52345

(51) Int. Cl.
*E06B 3/663* (2006.01)
*A47F 3/04* (2006.01)

(52) U.S. Cl.
CPC ........ *A47F 3/0434* (2013.01); *E06B 3/66328* (2013.01); *E06B 3/66333* (2013.01);
(Continued)

(58) Field of Classification Search
CPC ............. E06B 3/66328; E06B 3/66333; E06B 3/66342; E06B 2003/6638;
(Continued)

(56) References Cited

U.S. PATENT DOCUMENTS

| 2012/0090253 A1* | 4/2012 | Beresford | ........... E06B 3/66333 52/204.593 |
| 2015/0107167 A1* | 4/2015 | Baumann | ............ E06B 3/66319 52/172 |

(Continued)

FOREIGN PATENT DOCUMENTS

| DE | 94 11 674 U1 | 10/1994 | |
| DE | 202012104026 U1 * | 10/2013 | ......... E06B 3/66319 |

(Continued)

OTHER PUBLICATIONS

International Search Report as issued in International Patent Application No. PCT/EP2017/054175, dated Apr. 10, 2017.

*Primary Examiner* — Donald J Loney
(74) *Attorney, Agent, or Firm* — Pillsbury Winthrop Shaw Pittman LLP

(57) ABSTRACT

An insulating glazing includes two glass sheets that are spaced apart by an air- or gas-filled cavity, a spacer arranged at periphery of the glass sheets and that keeps the glass sheets spaced apart, the spacer being transparent and placed on one of the sides of the glazing, and a first barrier that is leaktight to water, formed by a structural seal, the material of which is watertight, and a second barrier that is leaktight to gases and to water vapor, the first and second barriers associated to the transparent spacer being made of transparent material, wherein the second barrier that is leaktight to gases and to water vapor and made of transparent material is arranged at an interface between the glass sheets and the transparent spacer on an internal side of the glazing, the (Continued)

structural seal also at the interface being positioned abutted and aligned with the second barrier.

23 Claims, 2 Drawing Sheets

(52) U.S. Cl.
CPC .......... *E06B 3/66352* (2013.01); *E06B 3/663* (2013.01); *E06B 3/66342* (2013.01); *E06B 2003/6638* (2013.01); *E06B 2003/66338* (2013.01); *Y02B 80/22* (2013.01); *Y02B 80/24* (2013.01)

(58) Field of Classification Search
CPC .......... E06B 2003/66338; Y02B 80/22; Y02B 80/24; A47F 3/0434
See application file for complete search history.

(56) References Cited

U.S. PATENT DOCUMENTS

| | | | | |
|---|---|---|---|---|
| 2015/0284987 A1* | 10/2015 | Lohwasser | .............. | B32B 27/08 428/34 |
| 2016/0120336 A1* | 5/2016 | Schneider | ............... | A47F 3/005 312/116 |

FOREIGN PATENT DOCUMENTS

| | | | |
|---|---|---|---|
| EP | | 2 456 942 A1 | 5/2012 |
| WO | WO 2010/119067 | | 10/2010 |
| WO | WO 2014/198549 A1 | | 12/2014 |

\* cited by examiner

INSULATING GLAZING UNIT, IN PARTICULAR FOR A CLIMATE CHAMBER

CROSS-REFERENCE TO RELATED APPLICATIONS

This application is the U.S. National Stage of PCT/EP2017/054175 filed Feb. 23, 2017, which in turn claims priority to French patent application number 1652345 filed Mar. 18, 2016. The content of these applications are incorporated herein by reference in their entireties.

FIELD

The invention relates to an insulating glazing intended for a door in particular of a climate-controlled, and in particular refrigerated, enclosure/unit, said glazing comprising at least two glass sheets that are spaced apart by at least one air- or gas-filled cavity by virtue of at least one spacer that is arranged at the periphery of the glass sheets, at least one transparent spacer being placed on one of the sides of the glazing.

The invention will more particularly be described with regard to an application to a refrigerated unit/display case, without however being limited thereto. The glazing of the invention may be used in any architectural application, any exterior-glazing application, any interior-glazing application, any partitioning application, etc.

BACKGROUND

A climate-controlled enclosure is more particularly intended to form a chiller unit or a freezer unit in which chilled or frozen products are respectively displayed, these products possibly being items of food or drinks or any other products that need to be kept cold —pharmaceutical products or flowers for example.

Although frozen products are increasingly being sold in units provided with what are called "cold" doors, comprising transparent insulating glazings, at the present time self-service fresh and ultra-fresh items of food are essentially sold in stores by means of vertical units that are open-fronted. Provided with a curtain of refrigerated air at the front face in order to isolate the items of food from the warm ambient environment of the store and to keep the items of food at their optimal preservation temperature, these units are quite effective from this point of view and, in the absence of physical barrier, allow products to be accessed directly, facilitating the act of purchase.

However, the absence of physical barrier in these vertical chiller units leads to substantial heat exchange between the ambient environment of the store and the much colder ambient environment generated inside these units, this having the following consequences:

- this heat exchange must be compensated for by greater refrigeration in order to guarantee temperatures that are optimal for the preservation of the food in the unit, this disadvantageously increasing the power consumption of these units;
- the ambient environment of the store is considerably cooled locally (cold-aisle effect), this leading to consumers avoiding venturing into these aisles except for essential purchases, reducing impulse buying. This local cooling of the aisles in question has grown over the last few years as the strictness of hygiene regulations has led to the temperature of conservation of foodstuffs being further decreased;
- moist air from the ambient environment of the store is siphoned off by the cold-air curtain on the front face of the unit, this leading to a rapid saturation of the unit's heat exchanger (also called an evaporator) which ices up, which then significantly decreases the efficiency of the heat exchange. It is therefore necessary to frequently de-ice the evaporator, typically two times per day, this leading to an increased power consumption and generating costs.

Confronted with these drawbacks, unit manufacturers have attempted to provide solutions, in particular involving optimizing the air curtains and heating the aisles with radiant heaters or hot-air blowers. This progress nevertheless remains limited with respect to customer comfort, and is to the detriment of power consumption. Specifically, the heat produced by these heating systems, which guzzle power, also partly heats the units, and thereby leads in the end to even more power being consumed to refrigerate these units.

Providing these open-fronted units with conventional cold doors allows these drawbacks to be effectively addressed. However, these solutions, which are tried and tested in freezer units for frozen products, have been slow to be adopted in chiller units. These doors have the disadvantage of placing a physical barrier between the consumer and the self-service product, possibly having potential negative consequences on sales.

Furthermore, these doors are manufactured to a design similar to that of the windows used in buildings: a frame made of profiles, generally made of anodized aluminum for reasons of esthetics, resistance to aging and ease of manufacture, frames the entire periphery of a double or triple glazing. The frame is generally adhesively bonded directly to the periphery and to the external faces of the glazing; it participates in the rigidity of the structure and allows the interlayer means (spacers) placed at the periphery of the glazing and separating the glass sheets to be masked from sight.

However, such a structural frame significantly decreases the vision area through the glazing. It has thus been proposed, to improve the vision area through glazings, to manufacture insulating glazings with spacers that are transparent at least on their vertical sides, furthermore creating a visual perception that the refrigerated windows placed side-by-side form a continuous transparent area.

The spacers are fastened with adhesives such as acrylic adhesives, which furthermore perform a watertightness function, the adhesive being at the interface between the spacer and the internal face of the glass sheets of the glazing. To perfect the sealing, a transparent additional seal is sometimes added such as a silicone seal positioned on the external side of the air-filled cavity of the glazing, on the edge of the spacer and between the two glass sheets.

The addition of a second leaktight barrier in particular made of silicone supplements the leaktightness by providing leaktightness not only to water but also leaktightness to gases and to water vapor.

However this additional seal on the edge of the glazing, although transparent, generates a negative visual impact for the consumer facing a refrigerated enclosure with such a glazing.

SUMMARY

The objective of the invention is therefore to produce an insulating glazing in particular for a climate-controlled enclosure that obviates the various aforementioned drawbacks, by providing leaktightness to water but also by optimizing the leaktightness to gases and to water vapor, while providing the biggest possible field of vision through the glazing, a person facing a refrigerated enclosure provided with a plurality of vertical glazings placed side-by-side laterally with one another having to have the impression of a continuous glass surface without the clear perception of vertical discontinuities.

According to the invention, the insulating glazing intended for a door of a climate-controlled, and in particular refrigerated, enclosure/unit, comprises at least two substantially parallel glass sheets that are spaced apart by at least one air- or gas-filled cavity, at least one spacer that is arranged at the periphery of the glass sheets and that keeps the two glass sheets spaced apart, at least one spacer being transparent and placed on one of the sides of the glazing, and also a first barrier that is leaktight to water, formed by at least one structural seal (having the role of structurally fastening the spacer to the glass sheets), the material of which is watertight, and a second barrier that is leaktight to gases and to water vapor, the two leaktight barriers associated with the transparent spacer being made of transparent material, and is characterized in that the second barrier that is leaktight to gases and to water vapor and made of transparent material is arranged at the interface between the glass sheets and the spacer on the internal side of the glazing, the structural seal also at the interface being positioned abutted and aligned with the second barrier.

Thus, a leaktightness to gases and to water vapor is guaranteed with transparent leaktight means that are positioned not on the edge face of the glazing but parallel to the glass sheets, greatly minimizing the visual impact.

The term "transparent" in the expression "transparent spacer" and "transparent material" relating to the transparent leaktight means is understood to mean allowing at least colors and shapes to be seen therethrough, it not necessarily being possible to read a text behind the transparent spacer.

The second leaktight barrier is positioned against the faces for fastening the spacer to the glass sheets.

According to one feature, the second leaktight barrier stops at the edge of the spacer facing the gas-filled cavity (it does not stick out toward the interior of the gas-filled cavity relative to the spacer); it is furthermore limited to a reduced thickness of the spacer. The term "thickness" is understood to mean the dimension parallel to the plane of the glass sheet and perpendicular to the longitudinal dimension of the spacer which extends over one entire side of the glazing. It is therefore the dimension parallel to the glass sheets and in a horizontal plane in the fitted position of the glazing.

The second leaktight barrier and the structural seal extend over the thickness of the spacer for each face of the spacer opposite each glass sheet.

According to another feature, the second leaktight barrier has a thickness equivalent to the thickness of the structural seal, in particular from a few micrometers to 2 mm.

Consequently, the second leaktight barrier thus positioned and with such reduced dimensions, greatly minimizes the visual impact.

The transparent material that is leaktight to gases and water vapor is preferably butyl rubber or polyisobutene (PIB).

The watertightness is achieved by the barrier made by the structural seal that fastens the spacer to the glass sheets. This structural seal is positioned at the interface between each glass sheet and the face opposite the spacer. If the barrier that is leaktight to gases and to water vapor is positioned according to the invention on the internal side of the glazing, the structural seal abutted to said barrier opens from the external side of the glazing.

The first leaktight barrier that opens from the side opposite the gas-filled cavity (that is to say from the external side of the glazing) extends at the interface between the glass sheets and the spacer, being limited to the only faces of the spacer that are in contact with the glass sheets and strictly parallel to said glass sheets.

The structural seal is made of an adhesive and watertight transparent material, such as acrylic or silicone, which is optionally crosslinkable under the action of ultraviolet rays.

Advantageously, the structural seal does not necessarily need to extend over the entire thickness of the spacer, thus leaving space for positioning the barrier that is leaktight to gases and to water vapor.

Thus, the thin interfacial thickness of the watertight structural steel abutted to the barrier that is leaktight to gases and to water vapor provides an extremely compact transparent double barrier which becomes imperceptible when a person faces the refrigerated unit or is positioned at an angle.

This double barrier extends strictly parallel to the glass sheets. In no way does it extend in a direction transverse to the glass sheets.

This double barrier has a linear shape.

Each one of the first and second leaktight barriers are of parallelepipedal shape, preferably with a rectangular cross section in order to be as thin as possible.

According to another feature, the transparent spacer is made of glass.

In particular, when the spacer is made of glass, the spacer constitutes a glass bar cut in order to have a rectangular cross section. With a rectangular cross section, the spacer has continuous straight faces that are perpendicular to one another. Thus, the spacer does not have chamferred faces, greatly simplifying the cutting process.

As a variant, the transparent spacer is made of plastic, while being bulk or hollow, in particular made of SAN (styrene-acrylonitrile) or of PETg (glycolized polyethylene terephthalate) or of PMMA (polymethyl methacrylate), or of polycarbonate, or of polymethylpentene (TPX).

When the spacer is made of plastic, it is found that certain plastics used are permeable to water vapor and to gases. Therefore, according to one advantageous feature of the invention, the spacer made of transparent plastic comprises, on at least one of its internal and external faces, the internal and external faces being the faces that are parallel and opposite, respectively facing and on the opposite side from the air-filled cavity, a transparent coating that is leaktight to gases and to water vapor.

This coating is thin. The term "thin" is understood to mean a thickness of at most 500 µm.

The thin transparent coating that is leaktight to gases and to water vapor has a thickness preferably of between 2 nm and 200 µm.

The thin coating is a film added to the spacer or a deposited thin layer. Its thickness is above all linked to the type of material used and to the process for manufacturing same.

In the case of a deposited thin layer, this layer is deposited by any technique, such as by a magnetron process, evaporation, or else a liquid process.

The transparent thin coating that is leaktight to gases and to water vapor is, as a preferred example, made of silicon oxide, or aluminum oxide or else polysilazane.

The thin coating may additionally cover the corners of the internal and/external face(s) and extend over the adjacent faces which are parallel to the glass sheets (faces for fastening the spacer to the glass sheets).

The thin coating preferably covers the internal face of the spacer, which is facing the air-filled cavity, i.e. on the inside of the insulating glazing.

The thin coating may cover all the faces of the spacer.

The spacer and its coating preferably form a single assembly obtained during the manufacture of the spacer, that is to say that when the spacer is fitted into the glazing, it already comprises its coating. The coating is attached to the spacer.

Although this coating is positioned on the edge face of the spacer, parallel to the edge of the glazing, its visual impact is zero owing to its thinness and its transparency. The plastic spacer combined with this thin coating guarantees the function of leaktightness to gases and to water vapor without requiring thick beads of silicone as in the prior art on the edge/the external face of the spacer.

Moreover, the positioning of the double leaktight barrier at the interface according to the invention between the spacer and the glass sheets makes it possible to position the edge/the external face of the spacer coplanarly with the edge face of the glass sheets, the spacer is in fact less sunken toward the interior of the glazing, giving a maximized transparency effect for the whole of the glazing.

According to another feature, the glazing is a double glazing or triple glazing.

The glazing may advantageously be provided, on its glass sheets, with one or more low-emissivity coatings and/or an antifog or anti-frost layer, thus avoiding conventional heating means, this helping to save energy.

Lastly, the invention relates, on the one hand, to a door comprising a glazing according to the invention, and on the other hand, to a climate-controlled unit, of the refrigerated unit type, comprising at least one door or a glazing of the invention, or a plurality of glazings that are placed side-by-side side-by-side with one another, the transparent spacers being provided at least on the abutted-together sides of the glazings.

BRIEF DESCRIPTION OF THE DRAWINGS

The present invention is now described using merely illustrative and non-limiting examples of the scope of the invention, and with regard to the appended drawings, in which.

DETAILED DESCRIPTION

The figures are not to scale for the sake of readability.

Figure 1:
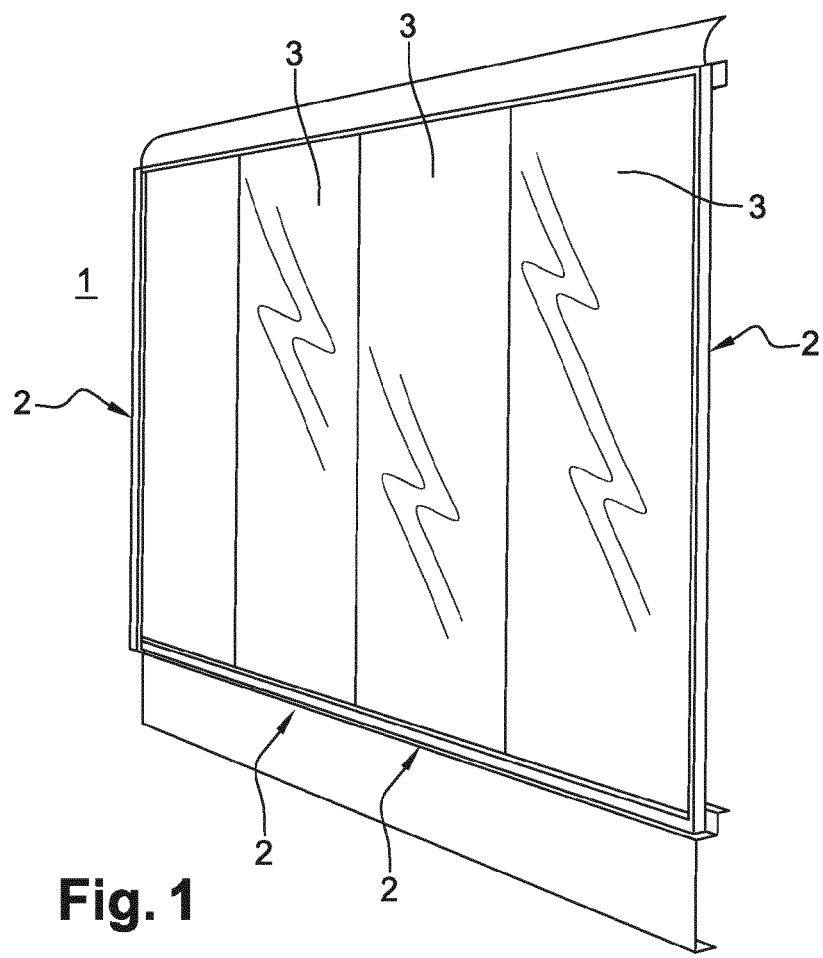
FIG. 1 illustrates a schematic perspective view of a front of a refrigerated unit incorporating a plurality of glazings according to the invention.

The climate-controlled unit 1 schematically illustrated in FIG. 1 comprises a plurality of doors 2 each comprising an insulating glazing 3 according to the invention.

The unit is for example a refrigerated chiller unit intended to be installed in a store aisle. It is thus possible, according to the invention, to form a unit with a whole row of doors that are laterally abutted together vertically along their edge faces.

In the case of a chiller unit/display case, since leaktightness is less critical than for a freezer unit, the door of the invention comprising the insulating glazing of the invention has no need to comprise vertical jambs forming a frame and provided with thick seals at the junction of two abutted doors/glazings. The glazing of the invention thus allows, because of the transparency of its vertical edges, a continuous transparent area to be achieved when the glazings are placed side-by-side via their edge faces.

Each insulating glazing comprises at least two glass sheets that are held parallely spaced apart by a frame the opposite vertical portions of which, in the mounted position of the glazing, are transparent.

The front of the glazings and therefore of the unit is thus devoid of any structural frame and has a virtually smooth glass-wall-like appearance. In this way vision area is increased.

Only the transparent vertical portion of the frame of the glazing, i.e. the portion corresponding to the invention, will be described below, the horizontal portions generally being formed by conventional interlayer means and sealing means that are not transparent. Likewise, the door that incorporates the glazing, the hinging means, the profiles for supporting and hiding the hinging means, and the type of handle will not be described.

Figure 2:
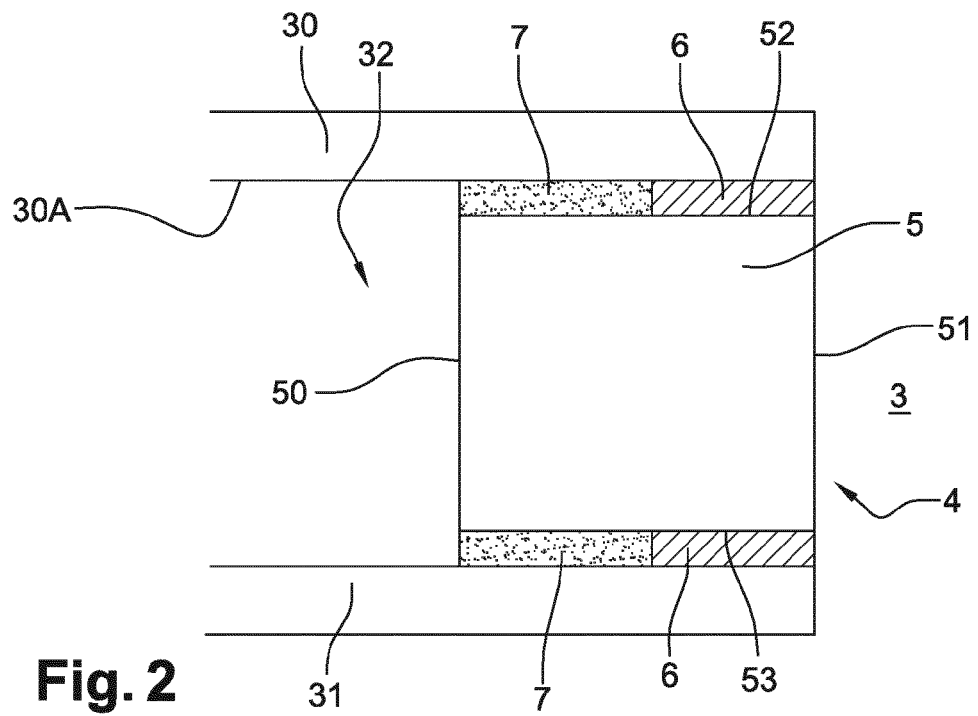
FIG. 2 is a schematic partial cross-sectional and top view of a glazing of the invention.

FIG. 2 illustrates a partial top view of the insulating glazing 3 showing the transparent vertical bottom portion 4 of the frame. The insulating glazing illustrated is a double glazing with two glass sheets. In the case of a triple glazing with three glass sheets, the glazing would comprise two transparent portions 4 according to the invention.

The glazing 3 comprises two glass sheets 30 and 31 that are parallely spaced apart by means of an interlayer element or spacer 5.

The glass sheets 30 and 31 are preferably made of tempered glass. The thickness of each of the glass sheets is between 2 and 5 mm, and is preferably 3 or 4 mm in order to minimize the overall weight of the glazing and to optimize the transmission of light.

The glass sheets are separated from each other by the spacer 5 in order to produce, therebetween, a volume forming a gas-filled cavity 32.

The gas-filled cavity 32 has a thickness of at least 4 mm and is modified depending on the desired performance in terms of the heat-transfer value U, but is however no thicker than 16 mm, or even than 20 mm.

The gas-filled cavity is filled with air or, preferably, in order to increase the level of insulation of the glazing, a noble gas, chosen from argon, krypton, xenon, or a mixture of these various gases, the noble gas filling the cavity to at least 85%. For an even further improved U value, it is preferable for the cavity to be filled with at least 92% krypton or xenon.

The spacer 5 preferably has a low thermal conductivity, having a thermal conductivity coefficient of at most 1 W/m·K, preferably less than 0.7 W/m·K, and even less than 0.4 W/m·K.

The spacer is entirely made of glass.

As a variant, the spacer has a body made of transparent plastic, of styrene-acrylonitrile (SAN) or polypropylene type for example.

The spacer 5 is of generally parallelepipedal shape and has four faces, a face called the internal face 50 facing the gas-filled cavity, an external opposite face 51 facing the exterior of the glazing, and two what are called fastening faces 52 and 53 facing the respective glass sheets 30 and 31. The spacer may in particular have, on its internal face 50, a profile with sections cut toward the corners.

The spacer 5 extends lengthwise (here not shown) over the entire length of each of the at least vertical sides of the glazing.

The spacer has a width (dimension transverse to the general faces of the glass sheets) equivalent to the desired spacing of the glass sheets.

The spacer has a thickness (distance separating the internal 50 and external 51 faces (between the edge of the glazing and the gas- or air-filled cavity)) which is equivalent to the width if the spacer has a square cross section, or which may in particular be smaller. Preferably, the spacer has a thickness of between 4 and 20 mm (and preferably between 9 and 15 mm).

The spacer 5 is fastened by adhesive bonding via its fastening faces 52 and 53 against the respective internal faces 30A and 31A of the glass sheets 30 and 31, by means of a structural seal 6 that furthermore provides watertightness.

The material of the structural seal 6 is transparent and watertight, for example made of silicone or acrylic.

The structural seal 6 is for example a double-sided adhesive tape.

The thickness of the structural seal 6 is between a few micrometers and 2 mm depending on the nature of the material as regards its bonding ability in particular.

The structural seal 6 extends over the length of the spacer on one side of the glazing, and along a limited width of each fastening face 52 and 53 of the spacer.

The structural seal 6 is positioned so as to open from the external side of the glazing.

Preferably, the spacer 5 via its external face 51 and each structural seal 6 at the interface with each glass sheet are coplanar with the edge of the glass sheets.

The glazing furthermore comprises a transparent barrier that is leaktight to gases and to water vapor.

According to the invention, the barrier that is leaktight to gases and to water vapor consists of leaktight means 7 positioned at the interface with each glass sheet 30 and 31 and the fastening faces 52 and 53 of the spacer.

The leaktight means 7 extend on the one hand over the length of the spacer, and on the other hand along the thickness of the spacer, being abutted to each structural seal 6.

According to the cross-sectional view from FIG. 2, the leaktight means 7 are aligned with the structural seal 6, parallel to each fastening face 52 and 53 of the spacer.

The leaktight means open from the internal side of the glazing facing the gas-filled cavity, preferably without going beyond the internal face 50 of the spacer.

The leaktight means 7 are preferably made of butyl rubber.

The leaktight means 7 have a thickness equivalent to that of the structural seal 6.

When the spacer is made of glass, the configuration from FIG. 2 is perfectly suitable for guaranteeing leaktightness to water and to gases and to water vapor. It is not necessary to add silicone to the external face of the spacer and between the glass sheets, like in the prior art. Consequently, the transparent portion 4 of the frame thus created provides leaktightness while very greatly minimizing the visual impact, no thickness of sealing material indeed being present transversely to the glass sheets, at the edge of the glazing.

Figure 3:
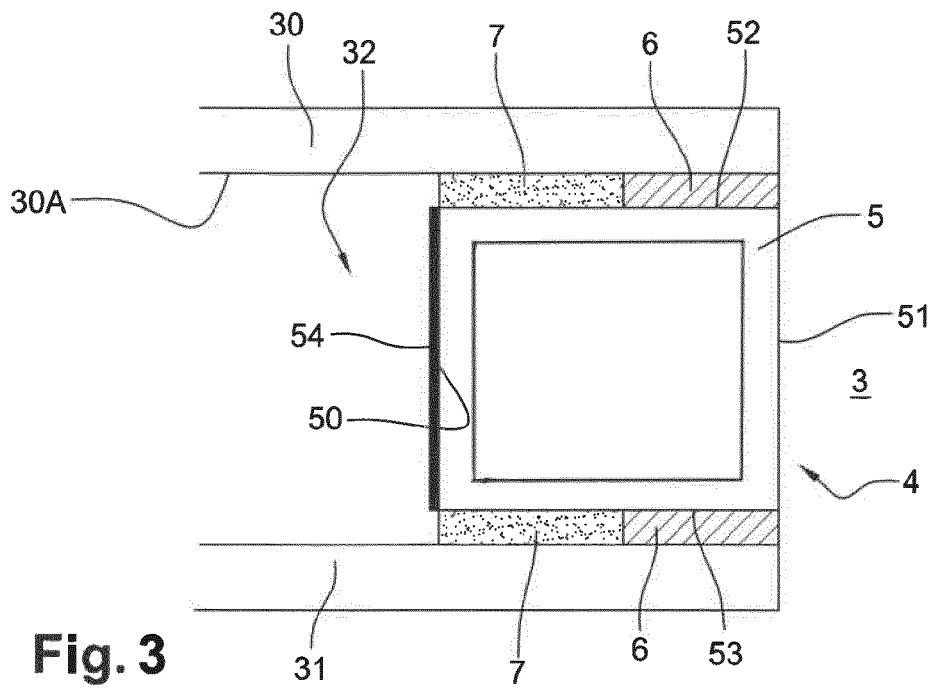
FIG. 3 is a schematic cross-sectional view of a glazing of the invention with a spacer variant, the spacer being hollow.

With regard to FIG. 3, when the spacer 5 is made of transparent plastic, it preferably comprises according to the invention a thin coating 54 made of a material that is leaktight to gases and to water vapor attached to the internal face 50 and/or external face 51 of said spacer.

The spacer made of transparent plastic may be bulk, or else hollow as illustrated schematically in FIG. 3.

Figures 4A, 4B:
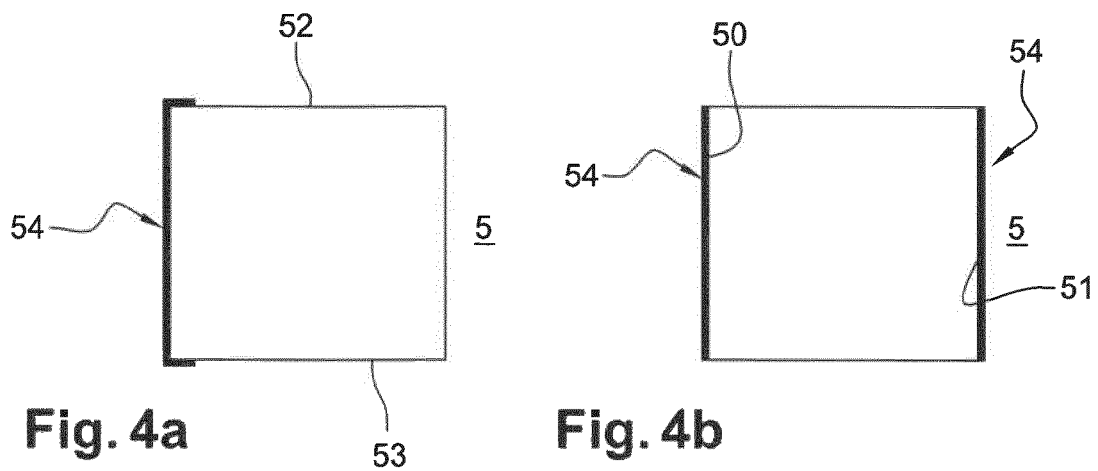
FIGS. 4a to 4d are schematic views of positioning variants of the thin leaktight coating of a spacer for a glazing of the invention, it being possible for the spacer to be bulk or hollow.

With regard to FIG. 4a, the coating 54 may cover one of the internal or external faces and the corners of the spacer by extending onto the fastening faces 52 and 53.

FIG. 4b illustrates the variant for which the coating 54 is both on the internal face 50 and external face 51.

Figures 4C, 4D:
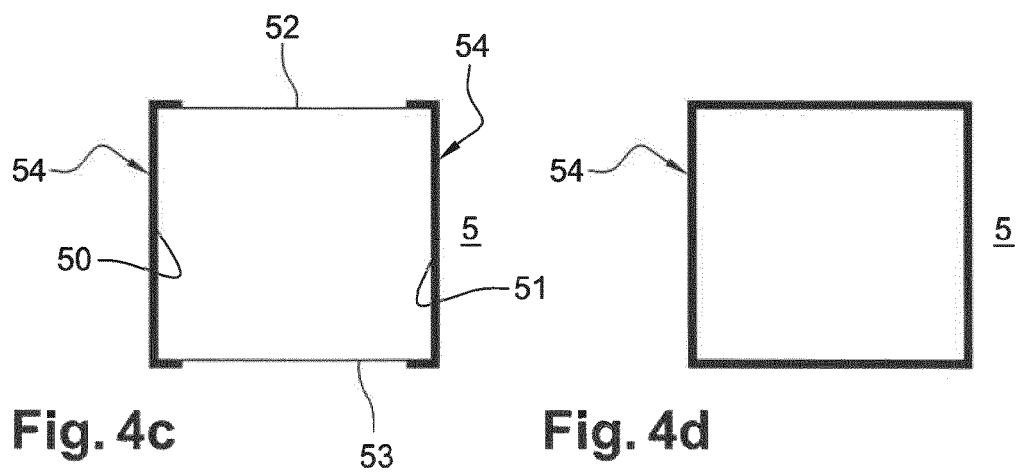

FIG. 4c corresponds to FIG. 4b, the coating 54 extending onto the fastening face.

FIG. 4d illustrates a variant for which the coating covers all the faces of the spacer.

This coating is thin, preferably with a thickness of between 2 nm and 200 μm.

The thin coating is a film added to the spacer or a deposited thin layer. Its thickness is above all linked to the type of material used and to the process for manufacturing same.

In the case of a deposited thin layer, this layer is deposited by any technique, such as by a magnetron process, evaporation, or else a liquid process.

The transparent thin coating that is leaktight to gases and to water vapor is, as a preferred example, made of silicon oxide, or aluminum oxide or else polysilazane.

Owing to the very thin thickness of the coating 54, this coating, although attached to the edge of the spacer, is imperceptible to the naked eye, which does not disrupt the transparent visual impression that the entire glazing must give, in particular at the join of two glazings abutted by their vertical sides comprising the transparent spacers.

The function of leaktightness to gases and to water vapor is guaranteed over the entire edge face of the glazing with no visual disturbance owing, on the one hand, to the second barrier 7 positioned and limited between the spacer and the glass sheets and, on the other hand, either to the glass spacer or to the transparent plastic spacer having a transparent thin coating attached to the edge of the spacer.

The invention claimed is:

1. An insulating glazing comprising at least two glass sheets that are spaced apart by at least one air- or gas-filled cavity, at least one spacer that is arranged at a periphery of the at least two glass sheets and that keeps the at least two glass sheets spaced apart, the at least one spacer being transparent and placed on one of the sides of the glazing, and a first leaktight barrier that is leaktight to water, formed by at least one structural seal, the material of which is watertight, and a second leaktight barrier that is leaktight to gases and to water vapor, the first and second leaktight barriers positioned on the at least one transparent spacer and each being made of transparent material, wherein the second leaktight barrier is in contact with both the spacer and the at least two glass sheets and arranged at an interface between each of the at least two glass sheets and the at least one transparent spacer on an internal side of the glazing, the at least one structural seal of the first leaktight barrier also provided at the interface in contact with both the spacer and the at least two glass sheets and being positioned such that it is abutted and aligned with the second leaktight barrier.

2. The glazing as claimed in claim 1, wherein the second leaktight barrier stops at an edge of the transparent spacer facing the gas-filled cavity.

3. The glazing as claimed in claim 1, wherein the second leaktight barrier and the at least one structural seal of the first leaktight barrier extend over a thickness of the transparent spacer for each face of the transparent spacer opposite each glass sheet.

4. The glazing as claimed in claim 1, wherein the second leaktight barrier has a thickness equivalent to the thickness of the at least one structural seal of the first leaktight barrier.

5. The glazing as claimed in claim 1, wherein the transparent material that is leaktight to gases and to water vapor of the second barrier is polyisobutene (PIB).

6. The glazing as claimed in claim 1, wherein the at least one structural seal is made of an adhesive and watertight transparent material.

7. The glazing as claimed in claim 1, wherein the transparent spacer is made of glass.

8. The glazing as claimed in claim 1, wherein the transparent spacer is made of plastic, while being bulk or hollow.

9. The glazing as claimed claim 8, wherein the transparent spacer made of transparent plastic comprises, on at least one of its internal and external faces, the internal and external faces being the faces that are parallel and opposite, respectively facing and on the opposite side from the air-filled cavity, a thin transparent coating that is leaktight to gases and to water vapor.

10. The glazing as claimed in claim 9, wherein the thin coating is a film added to the spacer or a deposited thin layer.

11. The glazing as claimed in claim 9, wherein the transparent thin coating is made of silicon oxide, or aluminum oxide, or polysilazane.

12. The glazing as claimed its claim 1, wherein the glazing a double glazing or triple glazing.

13. The glazing as claimed in claim 1, wherein the glazing is provided with one or more low-emissivity coatings and/or an anti-fog or anti-frost layer.

14. A door comprising a glazing as claimed in claim 1.

15. A climate-controlled unit, comprising at least one door as claimed in claim 14.

16. The glazing as claimed in claim 4, wherein the second leaktight barrier has a thickness from a few micrometers to 2 mm.

17. The glazing as claimed in claim 6, wherein the adhesive and watertight transparent material is acrylic or silicone, which is optionally crosslinkable under the action of ultraviolet rays.

18. The glazing as claimed in claim 8, wherein the transparent spacer is made of styrene-acrylonitrile (SAN) or of glycolyzed polyethylene terephthalate (PETg) or of polymethyl methacrylate (PMMA), or of polycarbonate or of polymethylpentene (TPX).

19. The glazing as claimed claim 9, wherein the thin transparent coating has a thickness of at most 500 μm.

20. The glazing as claimed claim 19, wherein the thin transparent coating has a thickness of between 2 nm and 200 μm.

21. The glazing as claimed in claim 10, wherein the deposited thin layer is deposited by a magnetron process, evaporation process, or wet-coating process.

22. The climate-controlled unit as claimed in claim 15, wherein the climate-controlled unit is a refrigerated unit.

23. A climate-controlled unit comprising a plurality of glazings as claimed in claim 1, the plurality of glazings being placed side-by-side with one another, the at least one transparent spacer associated with the plurality of glazings being placed at least on the sides abutted to one another of the glazings.

* * * * *